UNITED STATES PATENT OFFICE.

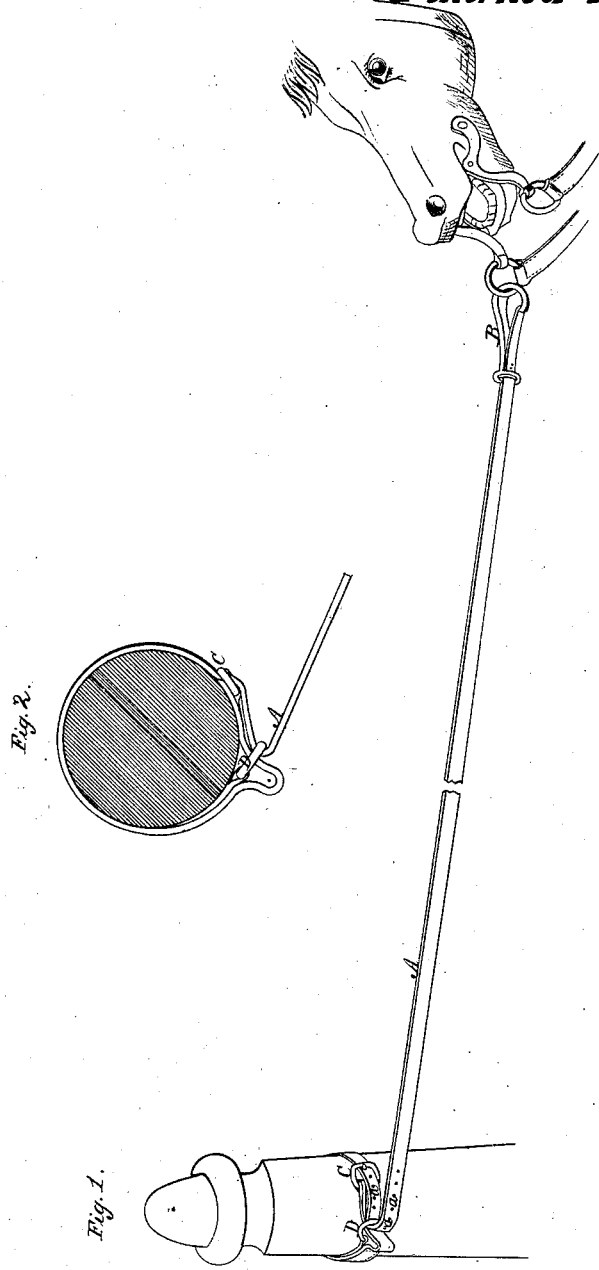

PETER CONOVER, OF KINGSESSING, PENNSYLVANIA.

HITCHING-STRAP.

Specification forming part of Letters Patent No. 41,366, dated January 26, 1864.

*To all whom it may concern:*

Be it known that I, PETER CONOVER, of Kingsessing, in the county of Philadelphia and State of Pennsylvania, have invented a new and Improved Hitching-Strap; and I do hereby declare that the following is a full, clear, and exact description of the same, reference being had to the accompanying drawings, forming a part of this specification, in which—

Figure 1 represents a perspective view of my invention. Fig. 2 is a plan or top view of the same.

Similar letters of reference in both views indicate corresponding parts.

To enable those skilled in the art to make and use my invention, I will proceed to describe it.

A represents a strap, made of leather or any other suitable material in the ordinary manner. To one end of this strap a snap-hook, B, is attached, which is intended to be used in the usual manner to catch in the bit-ring of the horse or animal to be secured by the strap. A buckle, C, which is fastened to the end of the strap opposite the hook B, serves to secure said strap to a post or tree. This buckle must be made large enough to allow of passing the hook freely through it, and a series of holes, a, in the strap are intended to catch on the tongue of the buckle and to retain the strap in the usual manner.

D is a ring, which is secured to the strap at a distance of about three inches, more or less, from the buckle, and which is secured to the under surface of the strap, said strap being made to pass through it, as clearly shown in the drawings. It (the ring) is sufficiently large to admit the hook B and to allow of passing the end of the strap with the hook freely through it. If the strap is fastened to a post or tree by passing the end with the snap-hook through the buckle and ring, and a strain is exerted on the strap, the ring D is drawn up closer and closer to the post and the strap assumes a position as clearly shown in Fig. 2. The strap can thus be readily and tightly drawn up to a post or tree, whatever its size. It is not necessary to make the holes $a$ in the strap very close together; and, furthermore, by the action of the ring the strap cannot spontaneously become detached from the tongue of the buckle and work loose from the post. Without the ring a slight strain on the strap in the proper direction will detach the same from the tongue of the buckle, rendering it loose on the tree and liable to come off from the post or to slide down on the ground, to the great annoyance of the horse and its attendant; and if a loop is attached close behind the buckle to retain the strap in the tongue, the snap-hook cannot be passed through it, or if said loop should be made large enough to admit of passing the hook, the strap could not be drawn tight after it has been buckled, and in order to adapt it to posts or trees of different thicknesses the holes $a$ must be made very close. By my arrangement the hook can be freely passed through the buckle and ring, and the strap can be drawn up tight to a post or tree of any size after it has been fastened in the buckle.

Having thus described my invention, I claim and desire to secure by Letters Patent as an improved article of manufacture—

A hitching-strap provided with a safety-ring, D, near the buckle, and otherwise constructed as herein shown and described.

PETER CONOVER.

Witnesses:
JOSEPH ENEN,
RICHD. R. DUTTON.